(12) United States Patent
Seki

(10) Patent No.: US 6,404,496 B1
(45) Date of Patent: Jun. 11, 2002

(54) INSPECTION OF MOLDED DISCS WITH POLARIZERS AND DISPLAY SCREEN

(75) Inventor: Mitsunori Seki, Aichi-ken (JP)

(73) Assignee: Kabushiki Kaisha Meiki Seisakusho, Aichi-ken (JP)

( * ) Notice: Subject to any disclaimer, the term of this patent is extended or adjusted under 35 U.S.C. 154(b) by 0 days.

(21) Appl. No.: 09/487,346

(22) Filed: Jan. 19, 2000

(30) Foreign Application Priority Data

Jan. 21, 1999 (JP) .......................................... 11-012613

(51) Int. Cl.⁷ .................................................. G01J 4/00
(52) U.S. Cl. ..................................................... 356/364
(58) Field of Search ................... 356/364, 237.1–237.5, 356/239.1–239.3, 239.7, 239.8; 250/223 B; 382/142; 348/127

(56) References Cited

U.S. PATENT DOCUMENTS 3,963,348 A * 6/1976 Nakatani et al. ............... 356/33
4,332,474 A * 6/1982 Miller ......................... 356/366
5,926,268 A * 7/1999 Bonewitz et al. ........... 356/240

* cited by examiner

Primary Examiner—Frank G. Font
Assistant Examiner—Michael P. Stafira
(74) Attorney, Agent, or Firm—Browdy and Neimark

(57) ABSTRACT

A method for testing injection-molded discs, such as CD or DVD discs, for the presence of residual stress by placing the discs between two polarizers uses a video screen provided as part of the injection machine's display unit as a light source. The screen is preferably made uniformly bright by removing text or drawings and being set to emit bright white light. The disc is set between and parallel to the two polarizing plates, whose axes are crossed. The machine operator views the screen through the crossed polarizers and freshly-made disc. Stress disturbs the polarization of light transmitted through the disc and shows molding defects as bright patches. The screen can be a CRT or a liquid crystal panel. The light is preferably made uniform by temporarily erasing letters or figures, used to show molding data, from the screen. Preferably a push-button activates and deactivates the bright white screen.

10 Claims, 3 Drawing Sheets

INSPECTION OF MOLDED DISCS WITH POLARIZERS AND DISPLAY SCREEN

FIELD OF THE INVENTION

The present invention relates to a simplified method of inspection for residual stress in transparent optical molded discs, particularly with polarized light inspection of transparent optical discs, and to an injection molding machine apparatus related to the method.

DESCRIPTION OF RELATED TECHNOLOGY

Apparatus for inspection of residual stress as used currently in the disc molding field has a polarizing plate on top of a box frame and another polarizing plate beneath the top polarizing plate which is kept at a given distance and parallel to the first plate, with polarized light meeting at a right angle (e.g., the polarizers are crossed). A fluorescent lamp is provided in the bottom of the box frame so that its light passes both polarizing plates. A molded disc is placed between the polarizing plates. If there is no residual stress in the molded disc, polarized light from the first polarizing plate will not pass the other polarizing plate, which causes molded disc to be dark overall in the range of vision. To the contrary, a molded disc with residual stress permits polarized light from a polarizing plate to pass partially to another polarizing plate because of the presence of anisotropy due to residual stress. The more stress or anisotropy, the brighter appears the inspected disc.

In another method, the residual stress of molded discs has been inspected by projecting the light of fluorescent lamp set in a factory's ceiling onto a molded disc which is put between two polarizing plates placed in parallel with polarization meeting at a right angle.

The above-mentioned apparatus for inspecting molded discs requires a large space and is inconvenient for use in a narrow and littered molding location. Also, the above-mentioned method of inspecting a molded disc, when the two polarizing plates are supported by hand, is inappropriate for accurate inspection. The projected light is weak and, in addition, observation of the overall molded disc is not easy. The operator's heat is prone to be conducted to the molded disc and the two polarizing plates due to hand's gripping, which may be deleterious.

OBJECTS AND SUMMARY OF THE INVENTION

In light of the above-mentioned problems, it is an object of the present invention to provide a novel method, and injection molding machine, for inspection of residual stress of transparent molded discs using polarized light.

It is another object of the present invention to provide a novel method and an injection molding machine for inspecting the residual stress of transparent molded discs in which polarized light is produced from light emitted on a screen of a CRT or a liquid crystal panel provided in a display unit of an injection molding machine.

It is another object of the present invention to provide a novel method and an injection molding machine for inspecting residual stress of transparent molded discs in which polarized light is produced from emitted light on a screen of a CRT or liquid crystal panel which is kept bright white, with letters and/or figures erased.

It is another object of the present invention to provide a novel method and injection molding machine for inspecting of residual stress of transparent molded discs with polarized light using light emitted from a CRT screen or liquid crystal panel, which is kept white with a letter or figure erased, by adjusting a setting unit to set the molding conditions.

BRIEF DESCRIPTION OF THE DRAWING FIGURES

For a better understanding of the operation, objects, and advantages of the invention, reference should be had to the description and accompanying drawing in which there is illustrated and described a preferred embodiment of the invention.

The above and other objects and the nature and advantages of the present invention will become more apparent from the following detailed description of an embodiment taken in conjunction with drawings, wherein.

DETAILED DESCRIPTION OF THE PREFERRED EMBODIMENTS

This invention will be described in further detail by way of example with reference to accompanying drawings.

Figure 1:
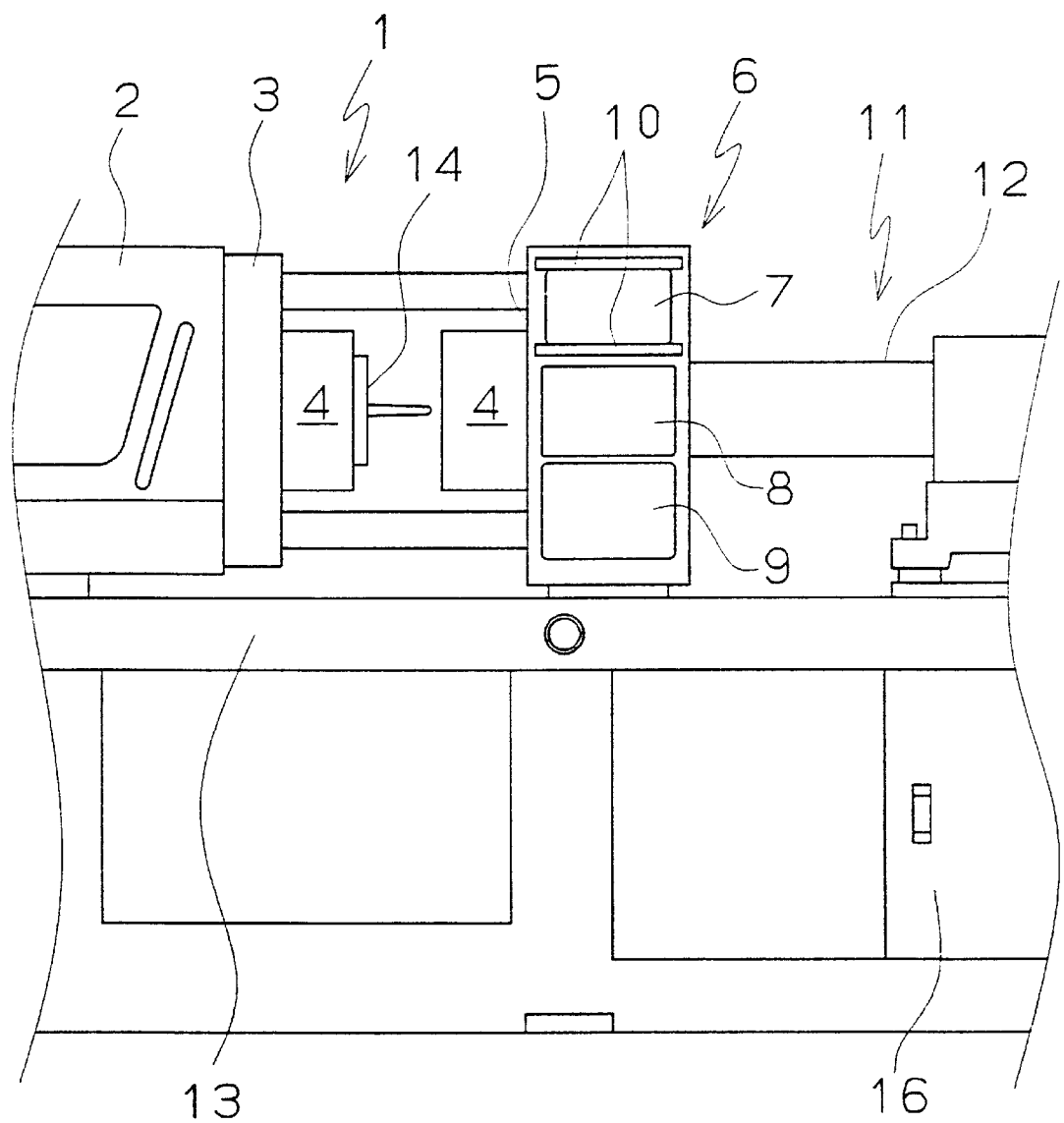
FIG. 1 is an partial elevational view of an injection molding machine.

FIG. 1 shows an injection molding machine which mounts a clamping unit 1, an injection unit 11, and a control unit 16 on a machine bed 13. The clamping unit 1 includes a stationary platen 5 and a movable platen 3 having a mold 4 and a safety door 2 to keep operators from getting close to the operating space of the movable platen 3. The injection unit 11 includes a heating barrel 12 in which a screw, capable of rotating and reciprocating, is mounted in order to plasticize and inject materials into the cavity of the mold 4. A manipulating board 6 of a control apparatus 16, which includes a display unit 7 of a display section 20, a setting unit 8 of a setting section 19 and a manipulating unit 9 of a manipulating section 18, is mounted on the side of the stationary platen 5. The manipulating board may be at another place, for example, the side of the machine bed 13 or the side of the injection unit, or, it may be placed away from the machine bed 13 to facilitate the operator's manipulation in accordance with the machine's size or form.

Figure 3:
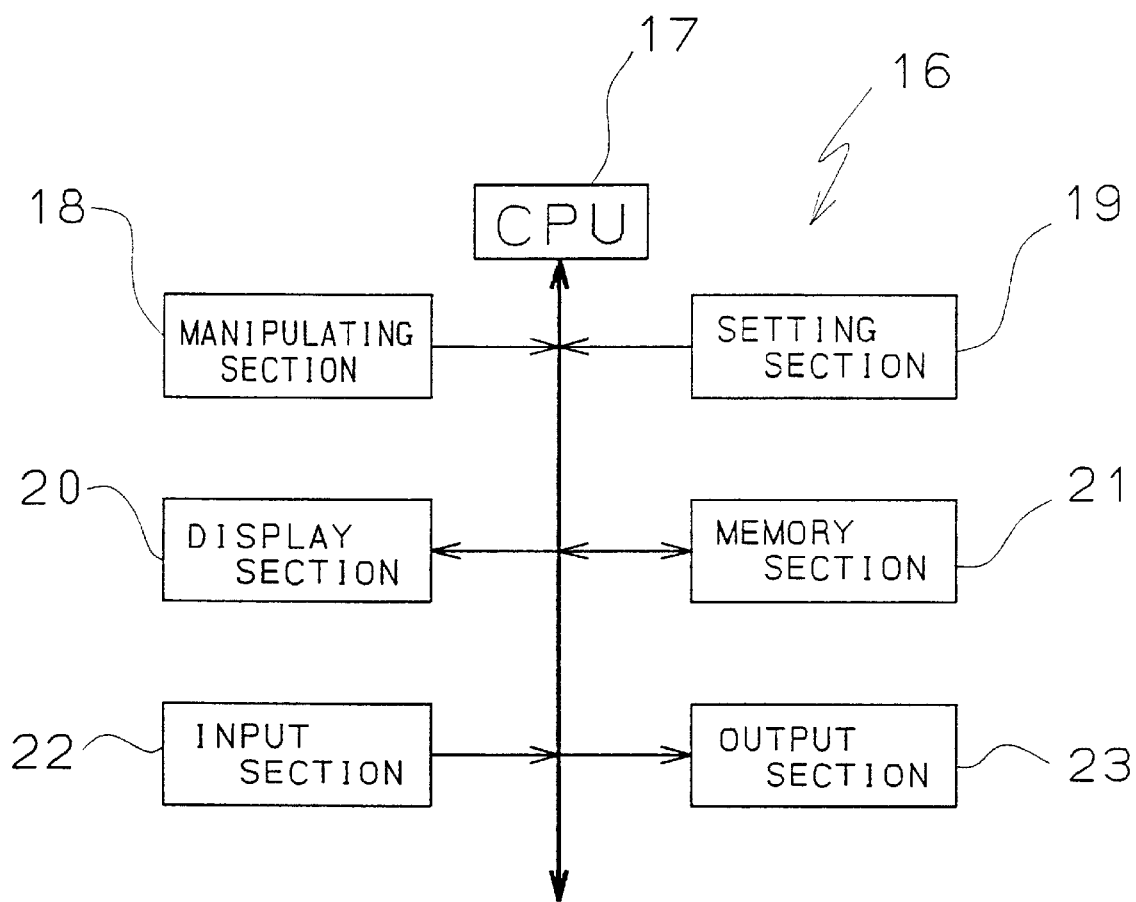
FIG. 3 is a block diagram of computer control of the injection molding machine.

FIG. 3 shows a block diagram of a microprocessor of the control apparatus 16, wherein CPU 17 operates according to programs stored in a memory section 21. The programs may relate to many conditions, of sequence control, process control, display control and temperature control.

A manipulating section 18 has push-button switches by which operators can manipulate the injection machine. A setting section 19 can set molding conditions including injection rate, injection pressure, metering position, the position of the movable platen, and the like. A display section 20, which displays set values (e.g, preset values), real values of molding conditions (e.g., measured quantities), and messages, includes a display unit 7 with CRT or liquid crystal panels, lamps, and light emitting diodes. Optimum molding conditions can be found in an interactive mode by watching a screen of CRT or liquid crystal panels on the display unit 7. An input section 22 inputs signals from sensors for position, pressure, temperature, and velocity. An output section 23 outputs controlling signals to hydraulic control valves, servo motors, and the like.

Figure 2:
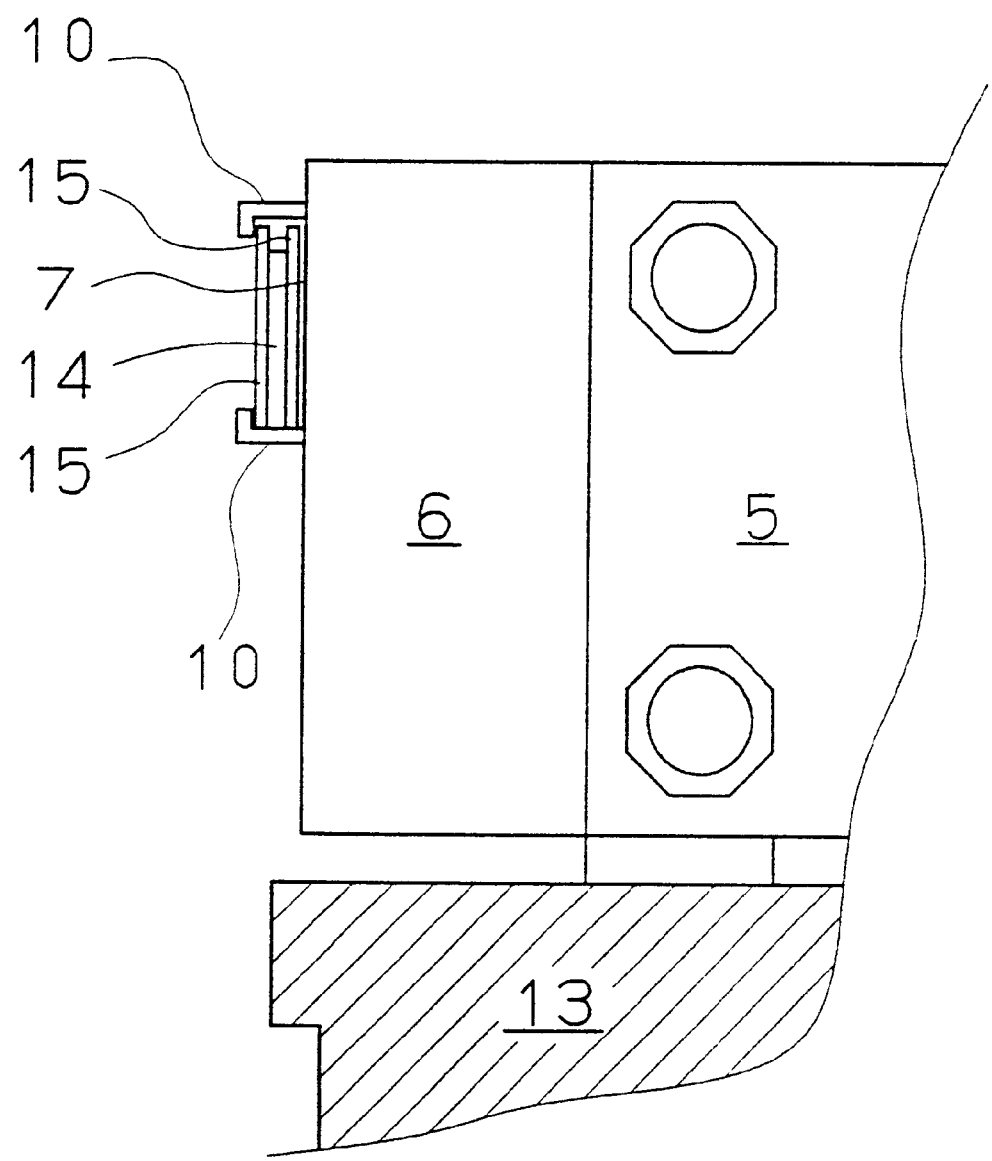
FIG. 2 is a side elevational view from an injection side.

FIG.2 shows a pair of guide frame bars 10, preferably with L-section plastic, provided at upper and lower positions on a window of the display unit 7, which may be at either left and right positions for inspecting residual stress of molded discs.

A molded disc is placed between two polarizing plates 15 positioned in parallel, with polarization axes at a right angle. These three discs are placed in parallel and in front of the screen of the CRT or liquid crystal panel located between the upper and lower guide frame bars 10. If the molded disc can not be placed there, then only one polarizing plate is inserted therein, and observation can be performed by gripping a disc and a polarizing plate by hand.

The guide bar is 10 mm in depth. The polarizing plate is formed by sticking a polarizing film on a transparent glass or plastic plate.

The presence of residual stress in transparent optical discs deteriorates performance of CD and DVD. When residual stress over a standard value is found, immediate modification of the molding conditions is required, and confirmation after modification is also required. To comply with this requirement, the present invention permits operators to ascertain the residual stress of optical discs at their working location by using luminous light from the screen of a CRT or liquid crystal panel provided with an injection molding machine.

In operation, after completion of a molding process mold 4 is opened and a molded disc is taken off from the mold 4. Then the molded disc is inserted between upper and lower guide frame bars 10 as above described, to be inspected. When a bad result is shown by the above-described inspection, the molding conditions are immediately modified. It is possible to inspect the molded disc when gripped hand, projecting onto the molded disc luminous light from the screen of CRT or liquid crystal panel provided with the injection molding machine.

In the above-mentioned inspection, a bright white (e.g., uniformly luminous) screen of the CRT or liquid crystal panel is preferable. It is desirable to keep the screen bright white so that letters and figures on the screen are erased to the extent possible.

(Screens of color other than white light can be used in the invention. Also, the degree of uniformity of the uniformly bright screen of the present invention—that is, the variation in brightness between any two illuminated areas—need be only sufficient to make disc defects readily visible, and this degree of uniformity need not be great in order to just show the presence of a defect. For measuring a degree of defect by brightness, and for making all defects maximally visible, a more substantially uniform brightness is desirable.)

However, the invention contemplates using a screen with some dark areas (e.g., letters or figures), as well as a uniformly bright white screen, to inspect for stresses which are larger than the letters or figure markings. Typically letters and figure markings occupy only a small portion of the area of a screen because of surrounding "white space" and because letters and markings include islands and peninsulas of background. The invention also contemplates moving a disc about while viewing over a screen including some figures or markings, to help discern the stress pattern. Preferably, however, the screen is blank, i.e. generally uniformly luminous, for testing the discs.

A preferred means for keeping the screen bright white is by erasing letters and figures of molding data from the screen with manipulating buttons or a key on the setting unit 8. Another means is that data for keeping the screen bright white is stored in the memory section 21. The data is retrieved to make the screen bright white by switching of a special button switch provided on the setting unit 8.

The invention contemplates commanding a brightness setting of the screen, preferably to provide maximum brightness so as best to show defects. In a three-color screen, all colors can be set toward maximum to provide a bright white screen.

The present invention, as described above, includes a novel inspection method for molded discs, and an injection molding machine capable of immediately confirming the presence of residual stress, as soon as a molded disc is taken from the mold at the operator's station. The present invention contemplates inspecting for residual stress with polarized light testing by using light emitted from the screen of a CRT or liquid crystal panel used for displaying molding conditions, as provided with an injection molding machine.

The present invention results in rapid modifying of incorrect molding conditions.

The present invention contemplates using a single sheet of polarizing material along with a screen which emits at least partially polarized light and/or includes its own full or partial polarizing structure, such as a polarizing screen cover sheet, implosion shield, or privacy shield.

Besides the guide frame bars of the drawing, the present invention includes any other kind of holder, including but not limited to clamps, pins, removable fasteners, magnets, suction devices, adhesive, transparent overlay sheets, static electricity devices, hinges, grooves, slots, bearings, and so on.

In the following claims, "switch" includes a key of a keypad or keyboard.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. A method of inspecting with polarized light for residual stress in a molded disc, at an operator's station of a disc injection molding machine, wherein the operator's station includes a luminous screen adapted to display letters or figures; the method comprising:

emitting luminous light from the screen;

aligning the molded disc between two polarizing plates such that the plates are generally parallel and with polarization axes thereof at a right angle;

projecting the light from said screen onto the molded disc placed between the two polarizing plates positioned in parallel and with polarized light meeting at a right angle; and viewing the molded disc;

whereby stress defects in the molded disc are visible at the operator's station.

2. The method for according to claim 1, including erasing letters or figures from said screen prior to the step of viewing the molded disc, whereby the screen is uniformly bright.

3. The method for according to claim 2, including providing a microprocessor including a memory section and data stored in the memory section, said data comprising instructions to keep the screen uniformly bright.

4. The method for according to claim 2, including providing at least one switch operable to make the screen uniformly bright by switching of the switch.

5. The method for according to claim 2, including setting the screen to emit bright white light.

6. A disc injection molding machine comprising:

a display-unit screen adapted to erasure of letters or figures displaying molding data therefrom in order to emit substantially uniformly luminous light; and a pair of guide frames disposed adjacent said screen, wherein the molded disc and two polarizing plates are emplaceable on a front of said screen.

7. A disc injection molding machine comprising:

a display-unit screen adapted to erasure of letters or figures displaying molding data therefrom in order to emit substantially uniformly luminous light; and a holder adapted to emplacement of the molded disc and two polarizing plates adjacent said screen to view defects of the disc.

8. A disc injection molding machine comprising:

a display-unit screen adapted to erasure of letters or figures displaying molding data therefrom in order to emit substantially uniformly luminous light;

a microprocessor including a memory section and data stored in the memory section, said data adapted to keep the screen uniformly bright; and a switch, provided on a mold-condition setting unit of the injection molding machine, the switch being operable to retrieve the data and to make the screen uniformly bright by switching of the switch.

9. A disc injection molding machine comprising:

a display-unit screen adapted to erasure of letters or figures displaying molding data therefrom in order to emit substantially uniformly luminous light; and a control operable to emit bright white light from the screen.

10. A method of inspecting with polarized light for residual stress in a molded disc, at an operator's station of an injection molding machine, wherein the operator's station includes a luminous screen adapted to display letters or figures; the method comprising:

emitting at least partially polarized light of substantially uniform intensity from the screen;

aligning the molded disc between the screen and at least one polarizing plate, such that the plate is generally parallel to the screen, and a polarization axis of the plate is generally at a right angle to a polarization axis of the screen; and viewing the molded disc;

whereby stress defects in the molded disc are visible at the operator's station.

* * * * *